(12) United States Patent
Kaiya et al.

(10) Patent No.: US 11,761,566 B2
(45) Date of Patent: Sep. 19, 2023

(54) CONNECTING PIPE

(71) Applicant: NITTO KOHKI CO., LTD., Tokyo (JP)

(72) Inventors: Kazumasa Kaiya, Tokyo (JP); Hiroshi Nishitsuji, Tokyo (JP)

(73) Assignee: NITTO KOHKI CO., LTD., Tokyo (JP)

( * ) Notice: Subject to any disclaimer, the term of this patent is extended or adjusted under 35 U.S.C. 154(b) by 147 days.

(21) Appl. No.: 17/330,849

(22) Filed: May 26, 2021

(65) Prior Publication Data

US 2021/0278022 A1    Sep. 9, 2021

Related U.S. Application Data

(63) Continuation of application No. PCT/JP2019/047766, filed on Dec. 6, 2019.

(30) Foreign Application Priority Data

Dec. 11, 2018 (JP) ................................ 2018-231853

(51) Int. Cl.
*F16L 41/02* (2006.01)
*F16L 27/08* (2006.01)

(52) U.S. Cl.
CPC ......... *F16L 27/0804* (2013.01); *F16L 41/021* (2013.01)

(58) Field of Classification Search
CPC ..... F16L 41/021; F16L 27/0804; F16L 27/10; F16L 27/1012; F16L 27/1021; F16L 27/107; F16L 7/113

(Continued)

(56) References Cited

U.S. PATENT DOCUMENTS 1,558,503 A * 10/1925 Pressler ................ F16L 27/107
    285/236
3,781,041 A * 12/1973 Petzetakis ............... F16L 13/10
    285/133.11

(Continued)

FOREIGN PATENT DOCUMENTS

CN    1747762    3/2006
JP    H0276992    3/1990

(Continued)

OTHER PUBLICATIONS

International Search Report for International Application PCT/JP2019/047766, dated Feb. 25, 2020.

(Continued)

*Primary Examiner* — David Bochna
(74) *Attorney, Agent, or Firm* — Burris Law, PLLC

(57) ABSTRACT

A connecting pipe has a connecting pipe portion having, at the opposite ends thereof, connection opening end portions. The connecting pipe has a bendable portion provided between the opposite ends of the connecting pipe portion to allow the connecting pipe portion to be bent relative to the longitudinal axis of the connecting pipe portion. The connecting pipe further has rigid portions extending from the bendable portion to the connection opening end portions, respectively. The rigid portions have a higher rigidity than the bendable portion. Bending the connecting pipe portion at the bendable portion allows the connection opening end portions at the opposite ends to be fitted to associated pipe end portions, respectively. The connecting pipe portion has an elastic restoring force to maintain the state where the connection opening end portions are fitted to the associated pipe end openings, respectively.

6 Claims, 4 Drawing Sheets

(58) Field of Classification Search
USPC .............. 285/325, 133.11, 133.3, 133.5, 237
See application file for complete search history.

(56) References Cited

U.S. PATENT DOCUMENTS

| | | | | |
|---|---|---|---|---|
| 3,791,679 | A * | 2/1974 | Glover | ................ F16L 43/008 |
| | | | | 285/133.11 |
| 3,820,826 | A * | 6/1974 | Ligon et al. | .......... F16L 41/021 |
| | | | | 285/55 |
| 5,551,733 | A * | 9/1996 | Henwood | ............ F16L 41/021 |
| | | | | 285/133.11 |
| 5,681,062 | A | 10/1997 | Fukao et al. | |
| 6,540,261 | B1 * | 4/2003 | Painter | .................. F16L 41/021 |
| | | | | 285/133.4 |
| 10,054,338 | B2 * | 8/2018 | Army, Jr. | ................. F16L 27/08 |
| 2006/0284423 | A1 | 12/2006 | Katsuno et al. | |
| 2007/0236010 | A1 * | 10/2007 | Campau | ............ F16L 25/0045 |
| | | | | 285/133.11 |
| 2011/0155941 | A1 | 6/2011 | Østergaard et al. | |
| 2015/0338002 | A1 * | 11/2015 | Lashinske | ............ H01R 13/629 |
| | | | | 285/325 |
| 2017/0336008 | A1 * | 11/2017 | Hankins | .................. F16L 33/34 |
| 2018/0172189 | A1 * | 6/2018 | Hobbs | ................. F16L 27/1021 |
| 2018/0180203 | A1 * | 6/2018 | Yashin | ................ F16L 55/1608 |
| 2019/0331267 | A1 * | 10/2019 | Warren | ................ F16L 41/021 |
| 2021/0018119 | A1 * | 1/2021 | Jore | ....................... F16L 27/107 |
| 2022/0090714 | A1 * | 3/2022 | Coppini | ................ F16L 27/107 |

FOREIGN PATENT DOCUMENTS

| | | |
|---|---|---|
| JP | H0587284 | 4/1993 |
| JP | H09105492 | 4/1997 |
| JP | H09317965 | 12/1997 |
| JP | H1122882 | 1/1999 |
| WO | 2016201514 | 12/2016 |

OTHER PUBLICATIONS

Office Action issued in corresponding CN Application 201980080698.3, dated May 10, 2022, and an English translation, 10 pages.
Office Action issued in corresponding AU Application 2019396029, dated Jun. 30, 2022, 7 pages.

* cited by examiner

CONNECTING PIPE

CROSS-REFERENCE TO RELATED APPLICATIONS

This application is a continuation of International Application No. PCT/JP2019/047766, filed on Dec. 6, 2019, which claims priority to and the benefit of Japanese Patent Application No. 2018-231853, filed on Dec. 11, 2018. The disclosures of the above applications are incorporated herein by reference.

FIELD

The present disclosure relates to a connecting pipe comprising a connecting pipe portion having, at opposite ends thereof, connection opening end portions to be connected by being fitted to two pipe end portions located at mutually spaced positions and having respective pipe openings.

BACKGROUND

When connection opening end portions at opposite ends of a connecting pipe are to be connected by being fitted to two pipe end portions located at mutually spaced positions and having respective pipe openings, the distance between the connection opening end portions of the connecting pipe needs to be greater than the space between the two pipe end portions by a length of the portions to be fitted. Accordingly, it is difficult to install the connecting pipe between the two pipe end portions. On the other hand, there is known a conventional technique of using a connecting pipe made of elastomer resin so as to have elasticity. With this technique, after one end of the connecting pipe has been connected to one pipe end portion, the connecting pipe is deformed so that the other end thereof is aligned with the other pipe end portion, thereby making the connection (Japanese Patent Application Publication No. H09-105492).

SUMMARY

An object of the present disclosure is to provide a connecting pipe of the type described above which can be connected easily and which can maintain a connected state even more reliably.

Solution to Problem

That is, the present disclosure provides a connecting pipe comprising a connecting pipe portion having, at opposite ends thereof, connection opening end portions to be connected by being fitted to two pipe end portions located at mutually spaced positions and having respective pipe openings. The connecting pipe has a bendable portion provided between the opposite ends of the connecting pipe portion to allow the connecting pipe portion to be bent relative to a longitudinal axis of the connecting pipe portion, and rigid portions extending from the bendable portion to the connection opening end portions, respectively, the rigid portions having a higher rigidity than the bendable portion. Bending the connecting pipe portion at the bendable portion allows the connection opening end portions at the opposite ends to be fitted to the pipe end portions respectively associated therewith. The bendable portion has an elastic restoring force to maintain a state where the connection opening end portions are fitted to the pipe end portions associated therewith after the state has been established.

With the connecting pipe, connection to the pipe end portions is facilitated by bending the connecting pipe portion at the bendable portion, and after the connection has been made, the connected state is maintained by the elastic restoring force resulting from the bending.

The above-described connecting pipe may further have a branch pipe portion extending sideward from the connecting pipe portion between the opposite ends of the connecting pipe portion. The bendable portion may be provided at a joint between the branch pipe portion and the connecting pipe portion.

Specifically, the bendable portion may be formed by reducing the wall thickness of a corner between the connecting pipe portion and the branch pipe portion. In this case, it becomes easy to incline each rigid portion extending from the bendable portion, which is formed as a reduced wall thickness portion, with respect to the branch pipe portion so that the angle of the corner decreases.

The above-described connecting pipe may further have guide recesses provided in opposite end faces, respectively, of the connecting pipe portion to extend radially from the outer peripheral surface of the connecting pipe portion to the internal bore of the connecting pipe portion, the guide recesses allowing the pipe end portions to be guided from the outer peripheral surface toward the internal bore. The connection opening end portions at the opposite ends can be fitted to the associated pipe end portions even more easily by bending the connecting pipe portion at the bendable portion to engage the connection opening end portions with the pipe end portions, respectively, and thereafter, guiding the pipe end portions along the guide recesses.

In this case, the guide recesses extending to the internal bore may have respective bottom surfaces inclined so as to come closer to the end faces of the connecting pipe portion, where the guide recesses are provided, as the distance increases from the outer peripheral surface toward the internal bore. In other words, the bottom surfaces of the guide recesses in this case are most distant from the associated end faces at the outer peripheral surface, which facilitates guiding the pipe end portions into the guide recesses, respectively.

Further, the arrangement may be as follows. The connecting pipe portion has thick-walled portions at the connection opening end portions, respectively, the thick-walled portions each having a thickened wall extending from the internal bore to the outer peripheral surface. The guide recesses are formed in the thick-walled portions, respectively.

In this case, the arrangement may be as follows. The thick-walled portions are each formed in a substantially annular shape, as a whole, along the outer periphery of the connecting pipe portion, the thick-walled portions each having a part thereof cut off by a plane parallel to the longitudinal axis of the connecting pipe portion to have flat surfaces, respectively, the guide recesses being formed to extend from respective substantially central portions of the flat surfaces to the internal bore. Provision of the flat surfaces makes it possible to facilitate guiding the pipe end portions into the radial guide recesses, respectively, when making connection to the pipe end portions.

An embodiment of a connecting pipe according to the present disclosure will be explained below on the basis of the accompanying drawings.

DRAWINGS

DETAILED DESCRIPTION

Figure 3:
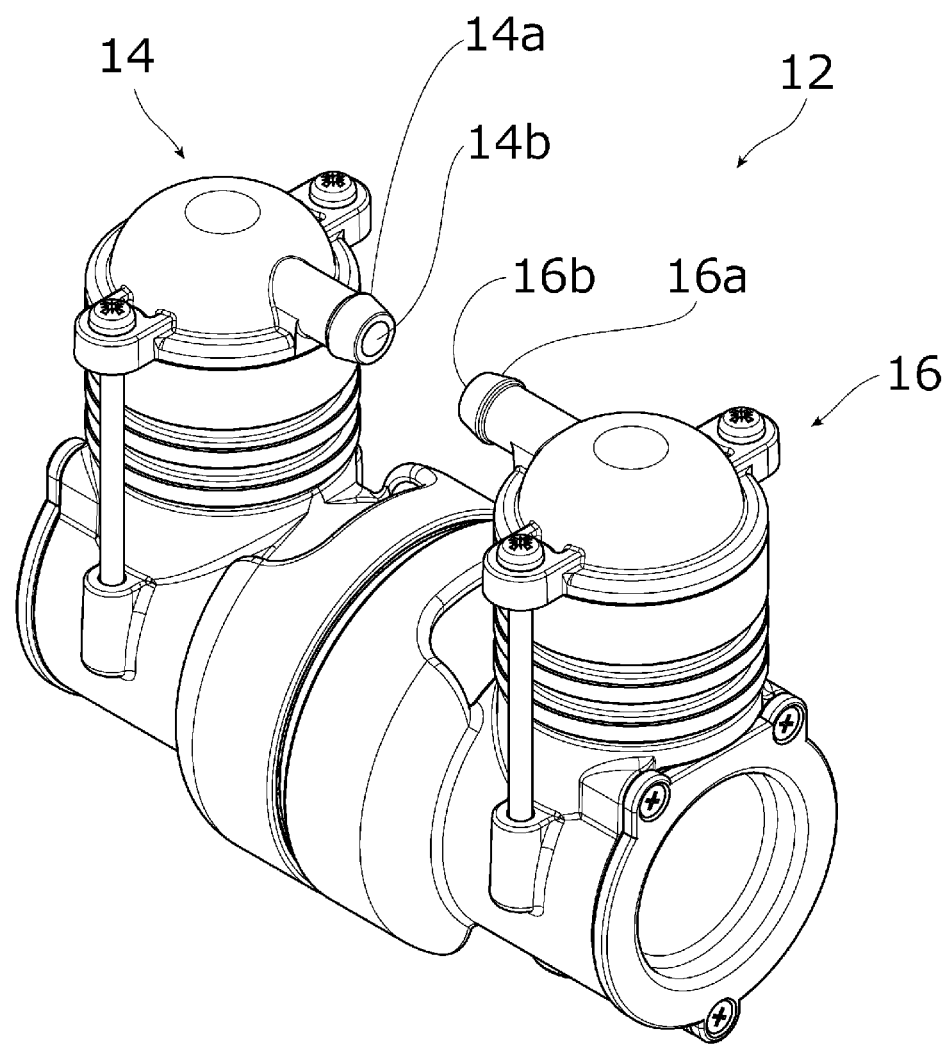
FIG. 3 is a perspective view of a twin pump as an example of an object to which the connecting pipe may be attached.
Figure 4:
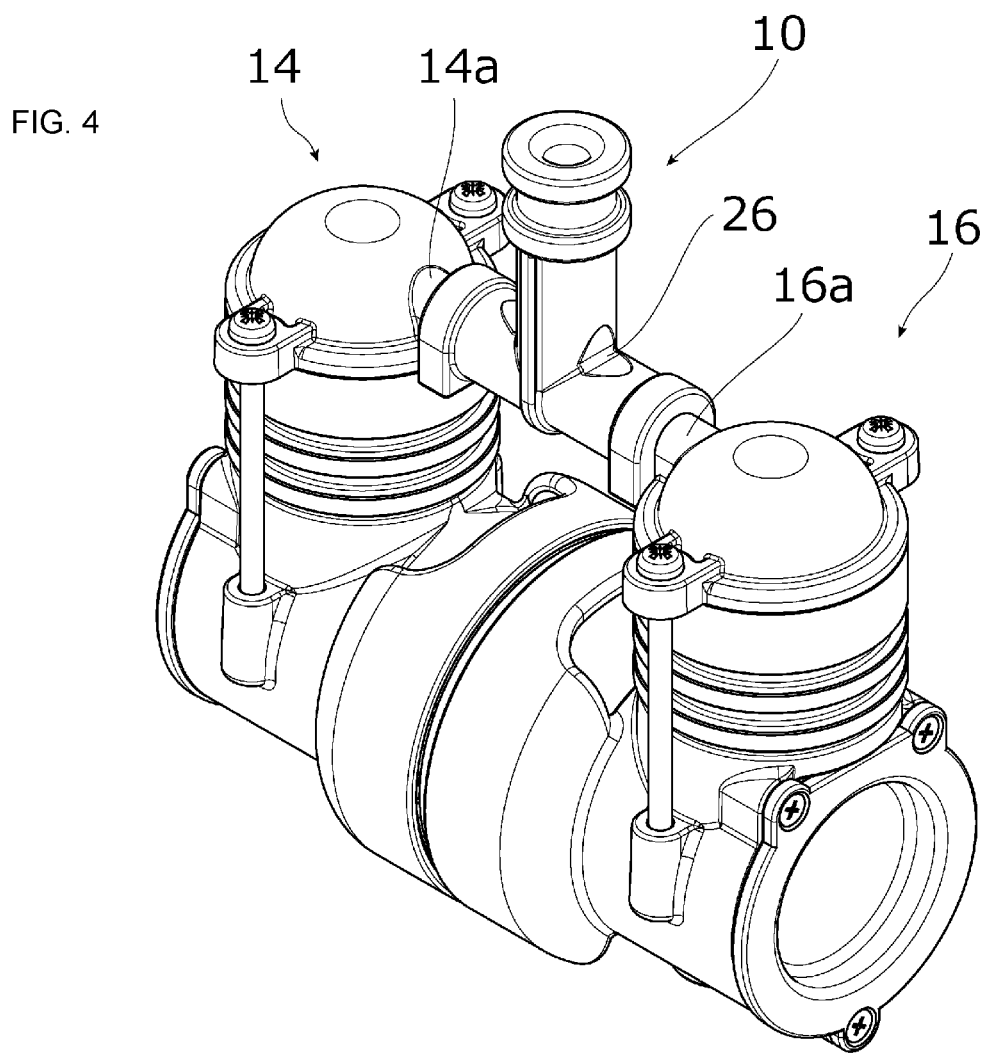
FIG. 4 is a perspective view of the state where the connecting pipe is connected to the twin pump shown in FIG. 3.

A connecting pipe 10 according to an embodiment of the present disclosure is configured to be attached between respective pipe end portions 14a and 16a of two pump units 14 and 16 of a twin pump 12 shown in FIG. 3. The twin pump 12 has two pump units 14 and 16 disposed symmetrically at the left and right sides thereof, respectively. The two pump units 14 and 16 are driven by a motor incorporated in the middle therebetween to discharge fluid from pipe openings (discharge openings) 14b and 16b of the pipe end portions 14a and 16a, respectively. The connecting pipe 10 is connected by being fitted to the pipe end portions 14a and 16a, as shown in FIG. 4.

Figure 1:
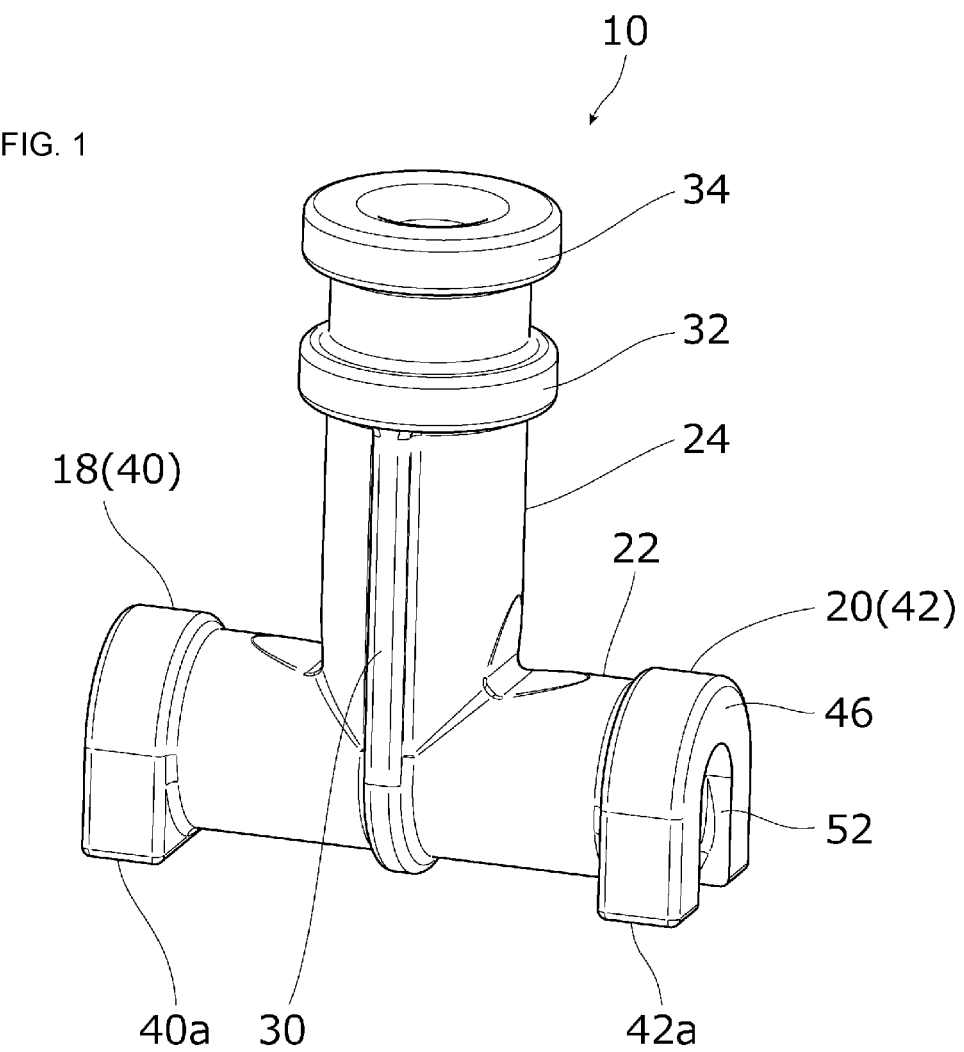
FIG. 1 is a perspective view of a connecting pipe according to the present disclosure.
Figure 2:
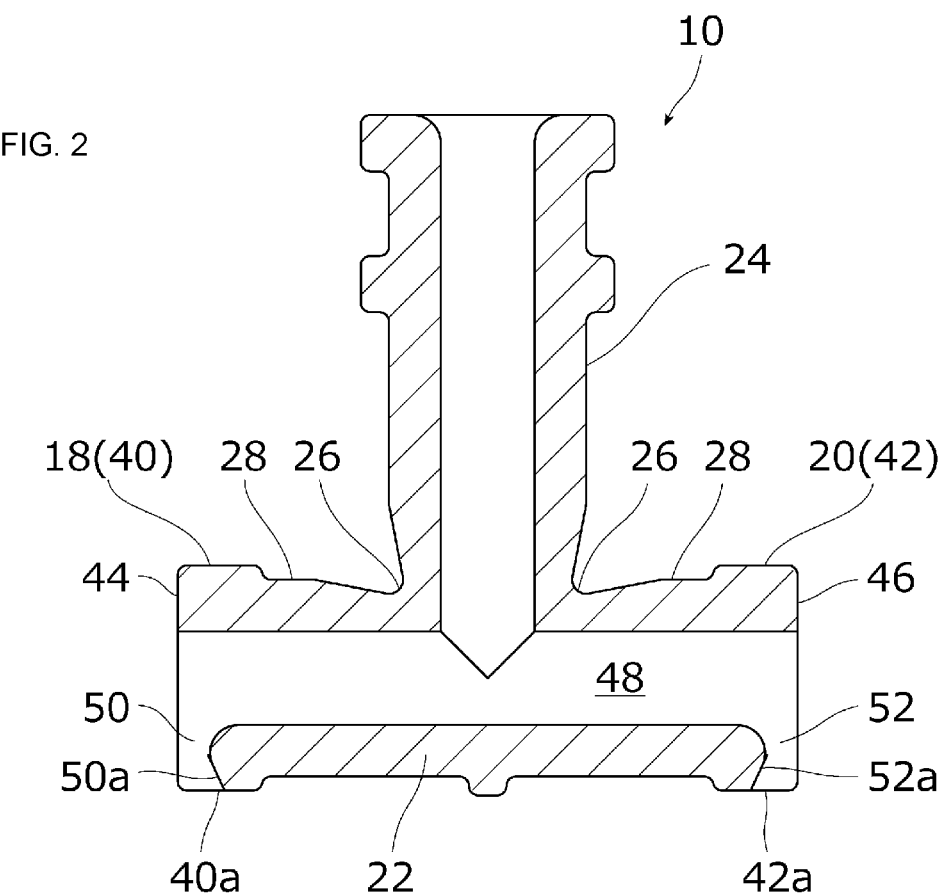
FIG. 2 is a longitudinal sectional side view of the connecting pipe.

As shown in FIG. 1, the connecting pipe 10 is formed as a T-shaped pipe having a connecting pipe portion 22 and a branch pipe portion 24. The connecting pipe portion 22 has, at opposite ends thereof, connection opening end portions 18 and 20 which are to be connected by being fitted to the pipe end portions 14a and 16a, respectively. The branch pipe portion 24 extends sideward from the connecting pipe portion 22 at an angle of approximately 90 degrees thereto between the opposite ends of the connecting pipe portion 22. The connecting pipe 10 is made of a relatively rigid synthetic resin (e.g. relatively rigid silicone) or the like so as to be relatively rigid as a whole. The connecting pipe 10 has, as shown in FIGS. 1 and 2, bendable portions 26 formed at the joint between the connecting pipe portion 22 and the branch pipe portion 24. The bendable portions 26 are formed by making the corners between the connecting pipe portion 22 and the branch pipe portion 24 thinner in wall thickness than the other regions. The bendable portions 26 allow the connecting pipe portion 22 to be bent relative to the longitudinal axis thereof. The connecting pipe 10 further has rigid portions 28 respectively extending from the bendable portions 26 to the connection opening end portions 18 and 20 at the opposite ends and having a higher rigidity than the bendable portions. The branch pipe portion 24 has, as shown in FIG. 1, an axial reinforcing rib 30 and annular reinforcing ribs 32 and 34 on the outer peripheral surface thereof.

The connecting pipe portion 22 is configured so that the connection opening end portions 18 and 20 at the opposite ends thereof have thick-walled portions 40 and 42, respectively. The thick-walled portions 40 and 42 have end faces 44 and 46 provided with guide recesses 50 and 52, respectively, which extend radially from the lower outer peripheral surface to an internal bore 48 of the connecting pipe portion 22. In the illustrated example, the thick-walled portions 40 and 42 are each formed in a substantially annular shape, as a whole, along the outer periphery of the connecting pipe portion 22. The thick-walled portions 40 and 42 each have a part thereof cut off by a plane parallel to the longitudinal axis of the connecting pipe portion, thus being formed into substantially inverted U-shapes having flat surfaces 40a and 42a, respectively. The guide recesses 50 and 52 are formed to extend from respective substantially central portions of the flat surfaces 40a and 42a to the internal bore 48. As shown in FIG. 2, the guide recesses 50 and 52 have respective bottom surfaces 50a and 52a inclined so as to come closer to the end faces 44 and 46 of the connecting pipe portion 22, where the guide recesses 50 and 52 are provided, as the distance to the internal bore 48 decreases. By providing the thick-walled portions 40 and 42 with the flat surfaces 40a and 42a, respectively, and by inclining the bottom surfaces 50a and 52a of the guide recesses 50 and 52 as stated above, the pipe end portions 14a and 16a of the twin pump 12 can be easily received into the connection opening end portions 18 and 20, respectively.

To connect the above-described connecting pipe 10 to the pipe end portions 14a and 16a of the twin pump 12, first, the connecting pipe portion 22 is bent at either or both of the bendable portions 26, which are provided at the opposite sides of the branch pipe portion 24, and the pipe end portions 14a and 16a are engaged with the guide recesses 50 and 52, which are located at the opposite ends of the connecting pipe portion 22. Next, the pipe openings 14b and 16b of the pipe end portions 14a and 16a are positioned to substantially align with the internal bore 48 of the connecting pipe portion 22. Thereafter, the connecting pipe portion 22 is made to recover from the bent state to the original straight state to allow the connection opening end portions 18 and 20 to be fitted to the associated pipe end portions 14a and 16a.

The bendable portions 26 of the connecting pipe portion 22 are configured to have an elastic restoring force sufficient to maintain the recovered state of the connecting pipe portion 22 when recovered from the bent state to the state where the connection opening end portions 18 and 20 are fitted to the associated pipe end portions 14a and 16a.

A connecting pipe as one embodiment of the present disclosure is as described above. The present disclosure is, however, not limited thereto. For example, although the foregoing connecting pipe has been explained as a T-shaped pipe, the present disclosure may be applied to a rectilinear connecting pipe having no branch pipe portion. Further, the connecting pipe portion may be curved or bent instead of being rectilinear.

What is claimed is:

1. A connecting pipe comprising a connecting pipe portion having, at opposite ends thereof, connection opening end portions to be connected by being fitted to two pipe end portions located at mutually spaced positions and having respective pipe openings, the connecting pipe comprising:

a bendable portion provided between the opposite ends of the connecting pipe portion to allow the connecting pipe portion to be bent relative to a longitudinal axis of the connecting pipe portion; and rigid portions extending from the bendable portion to the connection opening end portions, respectively, the rigid portions having a higher rigidity than the bendable portion;

guide recesses provided in opposite end faces, respectively, of the connecting pipe portion to extend radially from an outer peripheral surface of the connecting pipe portion to an internal bore of the connecting pipe portion, the guide recesses allowing the pipe end portions to be guided from the outer peripheral surface toward the internal bore, wherein bending the connecting pipe portion at the bendable portion allows the connection opening end portions at the opposite ends to be fitted to the pipe end portions respectively associated therewith, the bendable portion having an elastic restoring force to maintain a state where the connection opening end portions are fitted to the pipe end portions associated therewith after the state has been established.

2. The connecting pipe of claim 1 further comprising: a branch pipe portion extending sideward from the connecting pipe portion between the opposite ends of the connecting pipe portion;
    wherein the bendable portion is provided at a joint between the branch pipe portion and the connecting pipe portion.

3. The connecting pipe of claim 2, wherein the bendable portion is formed by reducing a wall thickness of a corner between the connecting pipe portion and the branch pipe portion.

4. The connecting pipe of claim 1, wherein the guide recesses extending to the internal bore have respective bottom surfaces inclined so as to come closer to the end faces of the connecting pipe portion, where the guide recesses are provided, as a distance increases from the outer peripheral surface toward the internal bore.

5. The connecting pipe of claim 1, wherein the connecting pipe portion has thick-walled portions at the connection opening end portions, respectively, the thick-walled portions each having a thickened wall extending from the internal bore to the outer peripheral surface, the guide recesses being formed in the thick-walled portions, respectively.

6. The connecting pipe of claim 5, wherein the thick-walled portions are each formed in a substantially annular shape, as a whole, along an outer periphery of the connecting pipe portion, the thick-walled portions each having a part thereof cut off by a plane parallel to the longitudinal axis of the connecting pipe portion to have flat surfaces, respectively, the guide recesses being formed to extend from respective substantially central portions of the flat surfaces to the internal bore.

\* \* \* \* \*